United States Patent [19]

Andrews

[11] Patent Number: 4,609,855
[45] Date of Patent: Sep. 2, 1986

[54] ADAPTIVE SERVOMOTOR CONTROL

[75] Inventor: Nicholas W. Andrews, Tempe, Ariz.

[73] Assignee: Motorola, Inc., Schaumburg, Ill.

[21] Appl. No.: 670,253

[22] Filed: Nov. 9, 1984

[51] Int. Cl.$^4$ ............................................. G05B 13/00
[52] U.S. Cl. ................................... 318/561; 318/611;
 318/617; 364/151; 364/152
[58] Field of Search ........................ 318/561, 611–616,
 318/617–619, 609, 610, 620, 621; 364/157, 149,
 148, 152, 162, 179

[56] References Cited

U.S. PATENT DOCUMENTS

| | | | |
|---|---|---|---|
| 3,911,345 | 10/1975 | Totten | 318/561 |
| 4,058,711 | 11/1977 | Ondercin | 364/157 X |
| 4,218,733 | 8/1980 | Maselli | 364/157 |
| 4,346,433 | 8/1982 | Rutledge | 364/149 X |
| 4,349,868 | 9/1982 | Brown | 318/561 X |
| 4,437,045 | 3/1984 | Mitsuoka | 364/148 X |
| 4,466,054 | 8/1984 | Shigemasa | 318/561 X |

*Primary Examiner*—William M. Shoop, Jr.
*Assistant Examiner*—Patrick C. Keane
*Attorney, Agent, or Firm*—Jonathan P. Meyer

[57] ABSTRACT

A servomotor controller provides high speed servomotor positioning be means of an on line adaptive state-feedback control algorithm. Servomotor position and velocity are the feedback states and each has an associated gain selected by means of a servomotor characterization scheme. The mechanical break frequency is used to select optimum gains and a high speed estimation technique is used to determine the mechanical break frequency. Position step change may also be used to select optimum gains. Gain tables are produced by an off-line simulation technique.

3 Claims, 5 Drawing Figures

ADAPTIVE SERVOMOTOR CONTROL

FIELD OF THE INVENTION

The present invention relates, in general, to the control of servomotors. More particularly, the invention relates to a microprocessor-based adaptive servomotor control apparatus and method which provides extremely high speed servomotor positioning.

BACKGROUND OF THE INVENTION

The problem of servomotor control is ubiquitous. Automated equipment must run as fast as possible and the time required to position a servomotor is largely lost time. Such diverse tasks as the testing of a semiconductor device and a positioning of a computer disk drive head are dependent, in part, on improvements in servomotor control for increases in the speed of the task.

Servomotors have historically been controlled by analog systems which do little to optimize the speed with which the servomotor is driven to a particular position. More recently, digital control systems have replaced analog ones. The advent of inexpensive microprocessors and memory has allowed the development of control schemes which adapt to current conditions in a relatively complex manner. However, the application of control theory to servomotor control and the development of highly optimized servomotor control schemes is a very recent development and is far from complete.

A particular area of interest is that of DC servomotors of the armature controlled, low inertia, low inductance type. Relatively accurate models of the behaviors of such motors have been available for at least a decade. Furthermore, modern control theory is available to devise optimized control algorithms for such motors. However, there has not been available a high speed servomotor controller based on the use of modern techniques. The theoretical limit on the speed with which such a servomotor may be positioned has not been approached.

SUMMARY OF THE INVENTION

Accordingly, it is an object of the present invention to provide an improved apparatus and method for servomotor control.

A further object of the present invention is to provide a microprocessor based, adaptive servomotor controller.

Yet a further object of the present invention is to provide a method and apparatus for high speed positioning of armature controlled DC servomotors.

These and other objects and advantages of the present invention are provided by a microprocessor-based servomotor controller which implements a closed loop state-feedback control algorithm. The microprocessor also implements an on-line adaptive algorithm by which the motor is continuously characterized and appropriate gains are selected for input to the state-feedback control algorithm. The entire controller is fast enough to drive a DC, armature controlled servomotor at near theoretical speed. An off-line motor simulation routine implemented on another computer is used to apply modern control theory to a model of the servomotor and produce gain tables for use by the control algorithm.

These and other objects and advantages of the present invention will be apparent to ones skilled in the art from the detailed description below taken together with the drawings.

DETAILED DESCRIPTION OF THE INVENTION

Figure 1:
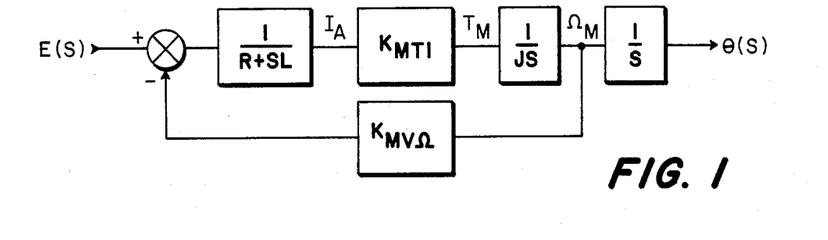
FIG. 1 is a block diagram illustrating a servomotor model.

FIG. 1 illustrates a servomotor model applicable to DC armature controlled, low inertia, low inductance servomotors. This model may be found in many standard references. The model illustrated in FIG. 1 has been transformed from the time domain using a Laplace transformation. The servomotor angular position is represented by $\theta$. The servomotor angular velocity is $\Omega M$. The torque of the servomotor is $T_M$. The armature current is $I_A$. The applied voltage which drives the servomotor is E. The load inertia is represented by J, the armature resistance is represented by R, the armature inductance is represented by L, the back EMF constant of the motor is $K_{MV\Omega}$, and the torque constant of the motor is $K_{MTI}$.

The model illustrated in FIG. 1 leads to a closed loop motor transfer function which relates motor position to applied voltage. That transfer function is:

$$\theta/E = \frac{\omega_m \omega_e / K_{mv\Omega}}{S(\omega_m + s)(\omega_e + s)}. \tag{1}$$

A mechanical break frequency, $\omega_m$, and an electrical break frequency, $\omega_e$ are derived as a consequence of this model. These break frequencies are given by:

$$w_m = \frac{K_{mti} K_{mv\Omega}}{J_t R}, \text{ and} \tag{2}$$

$$w_e = \frac{R}{L}. \tag{3}$$

The two break frequencies, particularly the mechanical break frequency are very useful in the application of modern control theory to the problem of generating a feedback control algorithm for driving the servomotor. This is discussed in greater detail below. However, significant non-linear temperature effects make the use of the mechanical and electrical break frequencies to alter the control algorithm extremely difficult. In addition, inertia differences between particular motors and loads lead to inaccuracies if a control algorithm with fixed gains is used on several machines. It is possible to implement elaborate numerical estimation techniques to approximate the motor model for given conditions and to alter the control algorithm according to that estimation. However, such estimation techniques are extremely difficult to implement quickly enough to allow them to be used online. Therefore, it is highly desirable to achieve a very fast estimation of the break frequencies, particularly the mechanical break frequency.

First, it is necessary to assume that, because of the extremely low armature inductance of the servomotor, the electrical break frequency is very much greater than the mechanical break frequency. With this assmuption, the denominator of the right hand side of equation (1) can be simplified by carrying out the indicated multiplications and removing terms involving only the mechanical break frequency. This results in:

$$\theta/E = \frac{\omega_m \omega_e / K_{mv}\Omega}{S^3 + S^2\omega_e + S\omega_m\omega_e}. \qquad (4)$$

Equation (4) may be further simplified and approximated, again assuming that the electrical break frequency is much greater than the mechanical break frequency, to yield:

$$\theta/E = \frac{\omega_m / K_{mv}\Omega}{S(S + \omega_m)}. \qquad (5)$$

The transfer function of equation (5) may be modified to relate velocity rather than position to applied voltage by dividing S to give:

$$\Omega/E = \frac{\omega_m / K_{mv}\Omega}{S + \omega_m}. \qquad (6)$$

A time domain solution for servomotor acceleration which satisfies equation (6) for step changes in desired servomotor position (that is, $E = 1/S$) is:

$$a(t) = \frac{E\omega_m \exp[-\omega_m t]}{K_{mv}\Omega}. \qquad (7)$$

For small values of t, that is during the initial linear response of the servomotor, equation (7) may be approximated as:

$$a(t) = \frac{E\omega_m}{K_{mv}\Omega}. \qquad (8)$$

Integrating equation (8) twice with respect to time yields:

$$\theta(t) = \frac{E\omega_m t^2}{2K_{mv}\Omega}. \qquad (9)$$

Solving equation (9) for the mechanical break frequency produces:

$$\omega_m = \frac{2\theta(t) K_{mv}\Omega}{Et^2}. \qquad (10)$$

All of the terms on the right side of equation (10) are known or may be determined with extreme rapidity in a servomotor feedback control loop. The back EMF constant is known from the specifications of the servomotor or may be found using simple electrical techniques. The position of the motor and the applied voltage are constantly being monitored by the control loop, as is discussed in detail below. It is possible to derive a measure of the time from a number of sources in a microprocessor controlled feedback loop and to perform the calculation in equation (10). However, it is somewhat faster to simply integrate a measurement of the product indicated in equation (10) over a period of time sufficient to produce a digital word in an appropriate range of values. This digital word may be used directly as a pointer to a location in a table at which either a value of the mechanical break frequency or some other useful value is stored. It has been found that the approximations necessary to achieve the estimation of the mechanical break frequency in equation (10) do not significantly reduce the accuracy of the estimation. In other words, equation (10) represents a parameter estimation algorithm for the mechanical break frequency of a low inductance servomotor which is sufficiently accurate to be useful, yet is sufficiently simple to be implemented on-line.

The details of the need to quickly estimate the mechanical break frequency is an on-line environment will be more apparent from the detailed discussion of servomotor simulation below.

The application of a state-feedback control algorithm to a servomotor requires knowledge of at least the current position and velocity of the motor. These two variables are referred to as the state variables, $X_1$ and $X_2$, respectively. In order to introduce a reference position, commonly referred to a the setpoint, and a reference velocity, $X_1$ and $X_2$ are defined as follows:

$$X_1 = \text{setpoint} - \text{current position}, \qquad (11)$$

and $$X_2 = \text{reference velocity} - \text{current velocity}. \qquad (12)$$

A state-feedback regulator functions by simply accepting the values necessary to calculate $X_1$ and $X_2$ and applying them to the calculation of a new driving voltage, V, according to the following:

$$V = -[K_1 X_1 + K_2 X_2]. \qquad (13)$$

As is apparent, as long as either the current position is different from the setpoint or the current velocity is different from the reference velocity, a driving voltage will be applied to the servomotor to change its state. The selection of the constants $K_1$ and $K_2$, which are commonly referred to as gains, determines the response of the state-feedback algorithm to setpoint changes and the speed with which the servomotor is driven to a particular state. As is described in detail below, a single set of gains, $K_1$ and $K_2$ are not sufficient to drive the servomotor at its optimum speed over its entire range of position changes, velocities, temperatures, etc. However, it is possible to characterize the region in which the servomotor is operating at any particular time by estimating the mechanical break frequency as described above. This characterization allows the selection of a set of gains, $K_1$ and $K_2$, which will optimally drive the servomotor in that region of operation.

Figure 2:
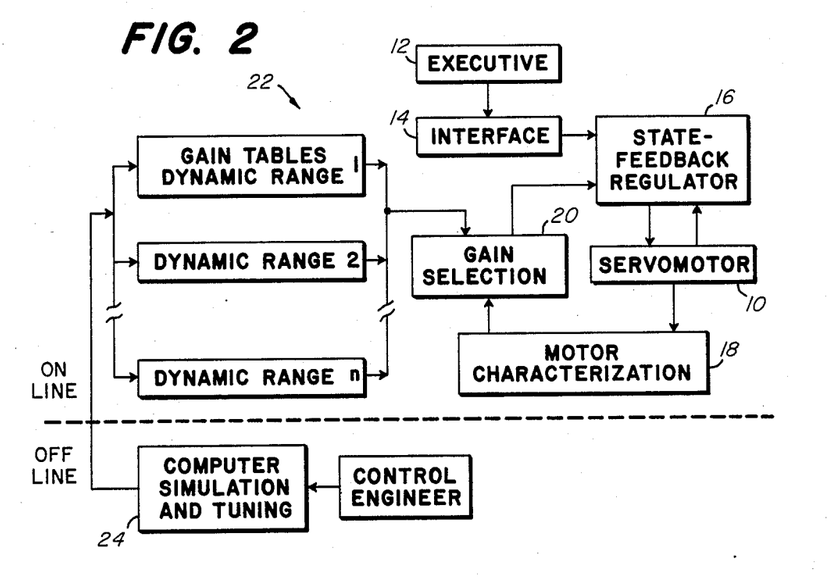
FIG. 2 is a block diagram illustrating an adaptive servomotor controller according to the principles of the present invention.

FIG. 2 is a block diagram illustrating a servomotor control apparatus which utilizes the principles discussed above to position a servomotor 10 extremely rapidly. Servomotor 10 is typically a portion of an apparatus under the control of an executive controller 12. For instance, in the context of a semiconductor device handler used in testing such devices, servomotor 10 is used for positioning the devices for testing and executive routine 12 comprises the computer and its software which control the testing and handling processes. Executive routine 12 passes a desired state of the servomotor, either a setpoint or a reference velocity through interface 14 to state-feedback regulator 16. State-feedback regulator 16 implements equation (13) and applies a driving voltage to servomotor 10. Current position and current velocity information are generated by sensing devices, typically an optical shaft encoder and a tachometer, and passed back to state-feedback regulator 16 for the recalculation of equation (13) and the application of a new driving voltage.

Simultaneously with the above described process, a motor characterization apparatus 18 is receiving information regarding the current position and driving voltage of servomotor 10 and implementing equation (10). This result is passed to gain selection logic 20, which identifies the currently calculated mechanical break frequency as fitting one of n dynamic ranges. In other words, the values of the mechanical break frequency to be expected given the type of machine in which servomotor 10 is serving are divided into n ranges. The number of ranges into which the expected values are divided depends on the amount of memory available. Gain selection logic 20 identifies the appropriate dynamic range for the currently calculated mechanical break frequency and selects the gains $K_1$ and $K_2$ from the corresponding one of gain tables 22. These gains are then supplied to state-feedback regulator 16 for use in implementing equation (13).

Accurate calculation of the gains for gain tables 22 depends on an accurate and time consuming simulation of servomotor 10. It is impractical to implement such a simulation in an on-line environment. Therefore, an off line computer simulation and tuning apparatus 24 is provided by which a control engineer can accurately simulate the response of servomotor 10 and tune that response toward an optimal response by the selection of appropriate gains. These gains are then supplied to gain tables 22. Many methods of simulating the response of servomotor 10 may be appropriate. A particular simulation scheme is described in detail below.

Figure 3A:
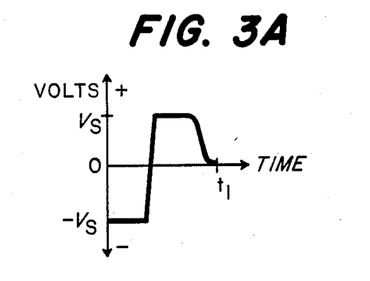
FIGS. 3A and 3B are graphs of voltage and velocity, respectively, illustrating the desired response of a servomotor.
Figure 3B:
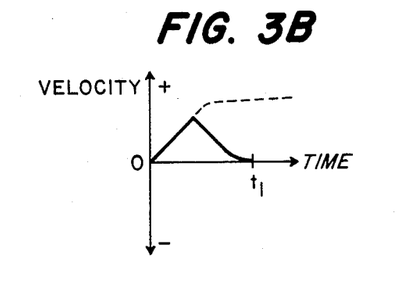

FIGS. 3A and 3B illustrate the desired response of a servomotor/controller system to a command to change from a first position at a time $T_0$ to a second position at a time $T_1$. The velocity, both at time $T_0$ and at time $T_1$ is zero. Immediately upon receipt of the command to change position the controller should output a drive voltage $-V_S$ such that the servomotor is saturated. That is, $V_s$ is the maximum voltage available from the servomotor/controller power supply.

The initial response of the servomotor to a step change in applied voltage is a roughly linear increase in velocity with time. In some cases, the very early portions of the velocity response may be non-linear due to inductance. However, it is generally acceptable to approximate the velocity response as linear. The dashed portion of the velocity response curve in FIG. 3B illustrates that if a steady driving voltage is applied over an indefinite period of time, the velocity response will deviate from its initial linear form and approach some maximum velocity. For present purposes, it is sufficient to assume that only the linear portion of the velocity response curve is involved. It is possible to artificially select only the most nearly linear portions of the response in which to gather input for motor characterization. This is an accurate characterization of servomotors in which changes of position of duration less than one time constant are involved. The time constant is the reciprocal of the break frequency.

Initially, the value of $K_1X_1$ was large and the value of $K_2X_2$ was zero. As the servomotor position moves toward the setpoint, $K_1X_1$ becomes smaller. As the velocity increases, $K_2X_2$ becomes larger. Thus, at some point at which the two values cross the applied voltage is shifted rapidly to $V_S$, thus decelerating the servomotor toward a stop at the desired position. This drive voltage should be maintained until the servomotor position nears the setpoint, at which time the applied voltage should be decreased until it reaches zero and the velocity of the servomotor reaches zero at precisely the point in time at which the servomotor reaches its desired position. The desired approach of the servomotor toward the setpoint is described as a critically damped response. Critical damping describes a condition in which the servomotor approaches its setpoint, without overshoot, in the shortest possible time.

Those familiar with servomotor control will appreciate that the goal expressed above is to approximate as nearly as possible a deadbeat response, which is theoretically the fastest possible servomotor positioning method.

Given that the desired response of the servomotor/controller system is that described in FIGS. 3A and 3B, and that the design of the servomotor/controller system is that described with reference to FIGS. 1 and 2, above, the problem becomes one of accurately simulating the servomotor response to arbitraty inputs and providing gains for the state-feedback algorithm (equation 13) which most nearly approximate the response of FIGS. 3A and 3B.

The starting point for this simulation is the model of a servomotor described with reference to FIG. 1 and the transfer function derived therefrom. Since the simulation is to be run off-line, it is not necessary to make as many approximations as were necessary in the analysis above. In fact, the simulation may be performed with complete rigor. However, some approximations are useful and will be pointed out. In particular, the transfer function as approximated in equation (4) is used rather than that stated in equation (1). This transfer function is inverted to the time domain, yielding:

$$\frac{d^3\theta}{dt^3} + \frac{d^2\theta}{dt^2}\omega_e + \frac{d\theta}{dt}\omega_m\omega_e = \frac{\omega_m\omega_e E}{K_{mv}\Omega}. \quad (14)$$

Certain variable substitutions are now carried out to render the analysis into a more familiar form for state-feedback control analysis. $X_1$ is substituted for $\theta$, $X_2$ is substituted for $\Omega$, $X_3$ is used to represent acceleration, and U is substituted for E. Carrying out the substitutions in equation (14) and solving for the time derivative of acceleration yields:

$$\frac{dX_3}{dt} = -X_3\omega_e - X_2\omega_m\omega_e + \frac{\omega_m\omega_e}{K_{mv}\Omega} \quad (15)$$

Since the time derivative of $X_1$ is $X_2$ and the time derivative of $X_2$ is $X_3$, it is possible to express the system of differential equations governing the behavior of the servomotor/controller system in matrix form as:

$$\frac{d}{dt}\underline{X} = \begin{bmatrix} 0 & 1 & 0 \\ 0 & 0 & 1 \\ 0 & -\omega_m\omega_e & -\omega_e \end{bmatrix}\underline{X} + \begin{bmatrix} 0 \\ 0 \\ \frac{\omega_m\omega_e}{K_{mv}\Omega} \end{bmatrix}\underline{U} \quad (16)$$

In equation (16), $\underline{X}$ is the state vector comprised of $X_1$, $X_2$ and $X_3$. For the sake of compactness, equation (16) is restated as:

$$\frac{d}{dt}\underline{X} = \underline{\underline{A}}\,\underline{X} + \underline{\underline{B}}\,\underline{U}. \quad (17)$$

The state-feedback control law is restated in a form parallel to that of equation (17) simplicity as:

$$\underline{U} = -\underline{\underline{F}}\underline{X}. \quad (18)$$

In equation (18) $\underline{\underline{F}}$ is the matrix of feedback gains and $\underline{U}$ is the controller output. The system described by equations (17) and (18) is continuous. In order to be readily implemented as a computer simulation it is necessary to obtain the equivalent discrete system.
This is accomplished by applying equations (19) and (20), below:

$$\underline{\underline{A}}(\text{discrete}) = \exp[\underline{\underline{A}}(\text{continuous})\,\Delta]; \text{ and} \quad (19)$$

$$\underline{\underline{B}}(\text{discrete}) = \left[\int_0^\Delta \exp(\underline{\underline{A}}(\text{cont})\tau)d\tau\right]\underline{\underline{B}}(\text{cont}). \quad (20)$$

In equations (19) and (20), $\Delta$ is the sample time and $\tau$ is in increments of $\Delta$. The integration indicated in equation (20) is typically carried out using numerical techniques.

From this point on the analysis is carried out entirely utilizing the discrete state-space system. This system of equations may be stated as:

$$\underline{X}(i+1) = \underline{\underline{A}}X(i) + \underline{\underline{B}}U(i), \quad (21)$$

and $$\underline{U}(i) = -\underline{\underline{F}}\underline{X}(i). \quad (22)$$

Equations (21) and (22) are sufficient to describe the servomotor/controller system completely. Equation (21), which arises from the servomotor model, relates the state of the servomotor at a point in time to its immediately preceeding state and to the drive voltage applied at that immediately preceeding point in time. Equation (22) merely states that the drive voltage is related to the current state of the servomotor by a set of feedback gains.

From equations (21) and (22) it is possible to apply well known techniques to obtain a feedback matrix F which performs to some set of criteria. This will not be the final set of feedback gains, but is useful for starting the fine-tuning process.

In order to find a linear optimal matrix $\underline{\underline{F}}$, it is necessary to apply a performance criterion. One such performance criterion may be stated as:

$$I = \Sigma[\underline{X}^T(j+1)\underline{\underline{R}}_1\underline{X}(j+1) + \underline{U}^T(j)\underline{\underline{R}}_2\underline{U}(j)] + \underline{X}^T(i)\underline{\underline{P}}\,\underline{X}(i). \quad (23)$$

In equation (23), $\underline{\underline{R}}_1$ and $\underline{\underline{R}}_2$ are weighting matrices and $\underline{\underline{P}}$ is referred to as a solution matrix. The performance criteria have been met when P achieves a known form.

By minimizing the performance criterion stated in equation (23), a linear optimal controller is found. It can be shown that minimization of this performance criterion to achieve a steady state optimal solution leads to the following equation, known as a discrete matrix Ricatti equation:

$$\underline{\underline{P}}(i) = \underline{\underline{A}}^T[\underline{\underline{R}}_1 + \underline{\underline{P}}(i+1)] \cdot [\underline{\underline{A}} - \underline{\underline{B}}\,\underline{\underline{F}}(i)]. \quad (24)$$

The discrete linear optimal controller thereby derived can be stated as:

$$\underline{\underline{F}}(i) = [\underline{\underline{R}}_2 + \underline{\underline{B}}^T[\underline{\underline{R}}_1 + \underline{\underline{P}}(i+1)]\underline{\underline{B}}]^{-1} \cdot \underline{\underline{B}}^T[\underline{\underline{R}}_1 + \underline{\underline{P}}(i+1)]\underline{\underline{A}}. \quad (25)$$

The minimum value of equation (23) is given by the $\underline{X}^T\underline{\underline{P}}\underline{X}$ term. It is desired to force this term to zero to find the steady state solution for $\underline{\underline{P}}$. Therefore, it is possible to achieve a numerical solution by starting with $\underline{\underline{P}}(i)$ as the null matrix and stepping back in time, or decreasing i, until the $\underline{\underline{F}}$ matrix values converge to within some chosen tolerance. In other words, equation (25) is used to find $\underline{\underline{F}}(i-1)$ from $\underline{\underline{P}}(i)$, with $\underline{\underline{P}}(i)$ starting out as the null matrix for large i. Then equation (24) is used to find $\underline{\underline{P}}(i-1)$ from $\underline{\underline{P}}(i)$ and $\underline{\underline{F}}(i-1)$. This result is used with equation (25) to find $\underline{\underline{F}}(i-2)$, and so forth. The process is repeated until each successive change in the $\underline{\underline{P}}$ and $\underline{\underline{F}}$ matrices is less than a predetermined threshold. This technique of recursively solving for the steady state forms of the $\underline{\underline{P}}$ and $\underline{\underline{F}}$ matrices is best achieved utilizing a general purpose computer. The program will require inputs describing the $\underline{\underline{A}}$ and $\underline{\underline{B}}$ matrices, the initial state vector, the mechanical and electrical break frequencies and the sampling interval. The output of the program includes the steady state $\underline{\underline{F}}$ matrix.

The steady state, linear optimal solution represented by the $\underline{\underline{F}}$ matrix does not account for the non-linear effects of saturation. Therefore, it is necessary to use the steady state optimal $\underline{\underline{F}}$ matrix to simulate motor responses to various position commands and to impose constraints on the driving voltage which simulate the non-linear constraints of saturation. This is accomplished by applying equation (26) below, starting with the steady state $\underline{\underline{F}}$ matrix found above to calculate the response of the servomotor to a particular position change command.

$$\underline{X}(i+1) = (\underline{\underline{A}} - \underline{\underline{B}}\,\underline{\underline{F}})\underline{X}(i). \qquad (26)$$

The response of the servomotor using a particular $\underline{\underline{F}}$ matrix may be compared to the desired response illustrated in FIGS. 3A and 3B. In other words, a complete set of servomotor states between a time $T_0$ and a time $T_1$, at which time the servomotor stops, is calculated. At time $T_0$, a step change of the position state, $X_1$ is introduced to simulate the input of a new setpoint to the servomotor controller. A large number of points between $T_0$ and $T_1$ are chosen to calculate servomotor position and velocity and apply equation (13). The complete set of positions and velocities between $T_0$ and $T_1$ is referred to as the trajectory of the system. The trajectory comprises the response of the servomotor/controller system to a particular setpoint change. In performing this simulation, it is necessary to place an artificial constraint on the $\underline{U}$ matrix such that the value of the driving voltage does not exceed the saturation voltage. Again, this simulation is readily carried out utilizing a general purpose computer.

The tuning of the system to achieve optimum performance when considering the non-linear constraints imposed by saturation is achieved by repeatedly running the simulation with variations in the weighting matrices $\underline{\underline{R_1}}$ and $\underline{\underline{R_2}}$ and/or variations in the feedback gain matrix $\underline{\underline{F}}$. This may be a relatively tedious process, but results in extremely accurate determination of a non-linear, $\underline{\underline{F}}$ matrix which is useful in setting up the gain tables illustrated in FIG. 2.

Once this tuning is performed, a further modification of the $\underline{\underline{F}}$ matrix is required to achieve optimum settling of the servomotor toward the setpoint. As described with reference to FIG. 3B, it is desired that the terminal portion of the velocity response be critically damped. It has been found that increasing the value of the velocity feedback gain, $K_2$ of equation (13) from the value produced by the simulation and tuning procedures described above produces the desired critically damped response.

To summarize the above analysis, a servomotor model and well known control theory techniques are used to produce a linear optimal state-feedback matrix, F, which is then modified to produce desired servomotor response when the non-linear constraint of saturation is introduced. This feedback matrix is then further modified to produce the desired critically damped response by increasing only the velocity feedback gain. The result may be referred to as a non-linear, suboptimal state-feedback matrix. The elements of this matrix are then used as the gains which are inserted in the gain tables of FIG. 2. Of course, the entire process must be repeated for each of the expected values of the mechanical break frequency in order to produce complete gain tables. Again, this is a relatively slow process, but produces gain tables which result in extremely fast and accurate servomotor positioning.

In some circumstances, characterization by means of the mechanical break frequency is not sufficient to obtain completely optimum feedback gains. For instance, in a particular embodiment of the present invention, step changes of 22.5°, 45.0°, 67.5° and 90° in the setpoint were to be expected. It was found that a set of gains which produced a desired response for one step change was not optimum for another step change. Therefore, the gain tables were made two-dimensional, with different gains for each of the four step changes within each mechanical break frequency range. The simulation/tuning process described above was repeated for each position to be completed in the expanded gain tables.

Figure 4:
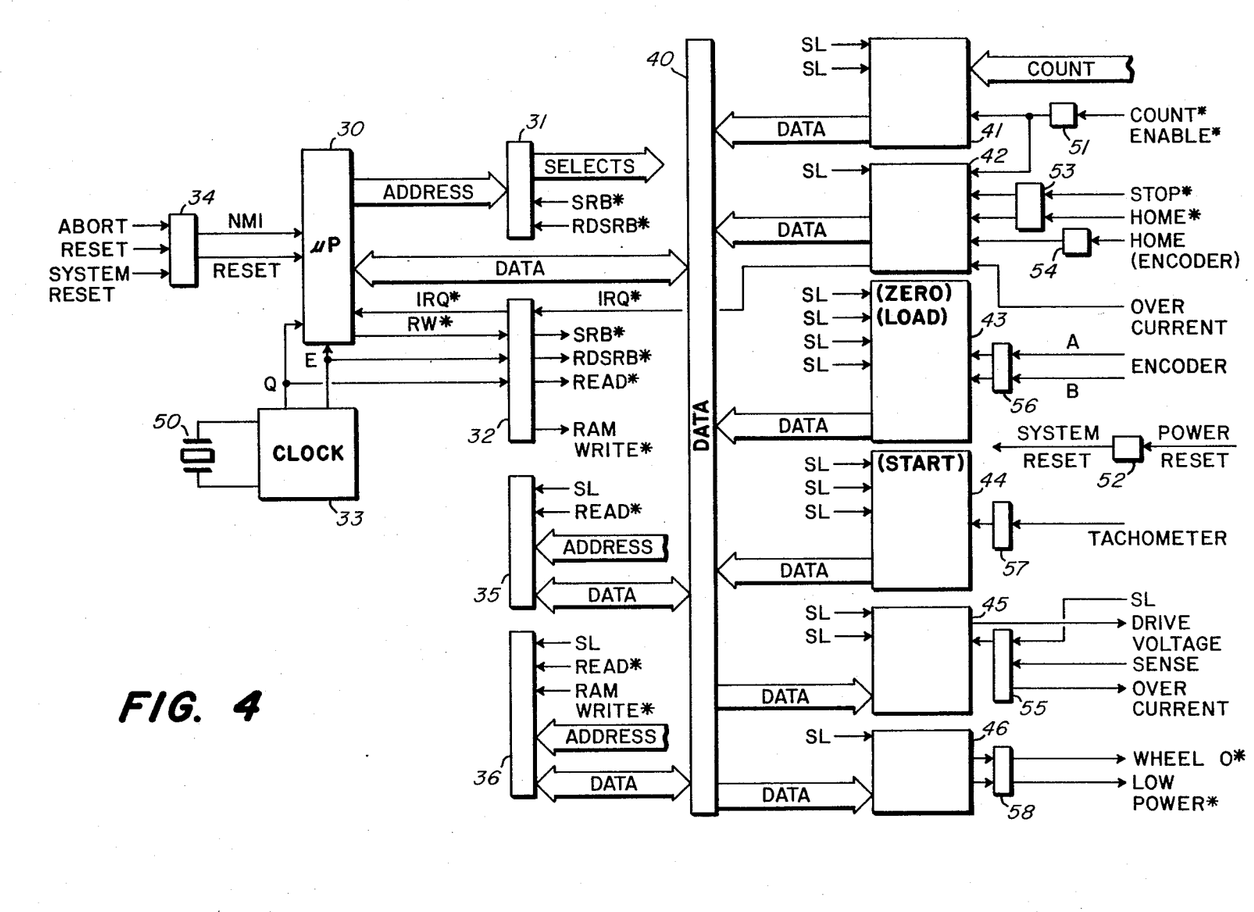
FIG. 4 is a detailed diagram illustrating a microprocessor based servomotor controller according to the principles of the present invention.

FIG. 4 is a detailed block diagram illustrating a microprocessor controlled servomotor controller board suitable for implementing a servomotor controller according to the principles of the present invention. The basic functional blocks of the controller board include a microprocessor 30, and address decode logic 31, a control logic 32, a clock generator 33, a reset/abort latch 34, a read only memory (ROM) memory array 35, a random access memory (RAM) array 36, a data bus 40, a position command register 41, an interrupt request cause register 42, a position logic 43, a tachometer analog-to-digital converter 44, an output digital-to-analog converter 45 and a status register 46. It should be noted that in FIG. 4 an asterisk (*) is used to indicate those lines which are active low. Another convention for identifying such lines places a bar over the word identifying the line.

Commands indicating a desired position of the servomotor are received through position command register 41 and interrupt request cause register 42. A machine controller, which is controlling the machine of which the servomotor is a part, provides these commands. Microprocessor 30, acting on instructions stored in ROM 35, implements a state-feedback regulator according to equation (13) above. The state variables $X_1$ and $X_2$ are obtained from the setpoint information and from the feedback information on position and velocity available through registers 43 and 44, respectively. The state-feedback gains, $K_1$ and $K_2$, are stored in ROM 35 in two-dimensional gain tables. In addition, microprocessor 30 is simultaneously performing the motor characterization algorithm described in equation (10), above, and obtaining a pointer which indicates the location in ROM 35 at which the optimum state-feedback gains are to be found. As a result of the these calculations, microprocessor 30 produces a new drive voltage, in digital form, which is converted to analog form by digital-to-analog converter 45 and applied to the motor. All of this must take place extremely quickly so that the servomotor is continuously receiving an appropriate drive voltage.

Microprocessor 30 may be, for instance, an MC68B09E microprocessor which is available from Motorola Semiconductor Products Sector, Phoenix, Ariz. Associated with microprocessor 30 are address decode logic 31, control logic 32, clock generator 33 and abort/reset latch 34. The function of each these items is familiar in the art.

Clock generator 33 is connected to a crystal oscillator 50 and produces two timing signals, Q and E, which are in quadrature phase relationship. Clock signals Q and E are connected to microprocessor 30 and to control logic 32, which is responsible for generating signals which control the timing of various operations in the system.

Control logic 32 generates a strobe (SRB*) signal and read strobe (RDSRB*) signal, a read (READ*) signal and a RAM write (RAM WRITE*) signal. Control logic 32 is connected to a read/write (RW*) line from microprocessor 30. Control logic 32 is also connected to an interrupt request (IRQ*) line from interrupt request cause register 42 and passes that signal on to microprocessor 30.

An abort/reset latch 34 is coupled to abort, reset and system reset lines and connects to the non-maskable interrupt (MMI) and reset (RESET) pins of microprocessor 30.

Address decode logic 31 is connected to the address pins of microprocessor 30 and also receives the strobe and read strobe signals from control logic 32. Address decode logic 31 provides the chip select (SL) signals necessary to select, or activate, the various chips on the controller board.

The data pins of microprocessor 30 are connected to data bus 40. ROM 35 is used to contain the instructions used by microprocessor 30 to carry out its functions. In addition, ROM 35 contains the state-feedback gains used to implement equation (11). ROM 35 is connected to a chip select signal (SL) from address decode logic 31 and to a read (READ*) signal from control logic 32. In addition, ROM 35 is connected to the address pins of microprocessor 30 and to data bus 40.

RAM 36 is similarly connected to data bus 40 and to the address pins of microprocessor 30. A chip select (SL) signal from address decode logic 31 is also connected to RAM 36. Control logic 32 provides a RAM/write (RAM WRITE*) signal to RAM 36. RAM 36 is used by microprocessor 30 to contain transient information generated during various calculations.

Position command register 41 receives and holds a count signal (COUNT) and a count enable (COUNT*ENABLE*) signal from the device which is controlling the machine of which the servomotor is a part. In a particular embodiment of the present invention, the count enable signal is passed through a CMOS/TTL converter 51 before being connected to register 41. The purpose of the count enable signal is to signal that the count currently in register 41 is a new count to be implemented by microprocessor 30. In a particular embodiment of the present invention the count signal comprises 9 bits which specify a number of increments that the servomotor is to be moved.

The count enable signal from CMOS/TTL converter 51 is also connected to interrupt request cause register 42, so that an interrupt request signal (IRQ*) may be sent to control logic 32 to initiate the reading by microprocessor 30 of the new count in register 41.

Register 41 is connected to a pair of chip select (SL) signals from address decode logic 31. In addition, the data pins of register 41 are connected to data bus 40. A power reset signal from the machine controller is connected to a CMOS/TTL converter 52, the output of which is connected to the system reset line of abort/reset latch 34.

Besides inputting a count indicating an amount which the servomotor should be moved, the machine controller may command that the servomotor be stopped or be reset to a home position. These commands are given by means of a stop (STOP*) signal and a home (HOME*) signal, respectively. These two signals are connected to a CMOS/TTL converter 53, the outputs of which are connected to interrupt request cause register 42. An indication that the servomotor is currently in the home position is passed from the optical shaft encoder to an analog/TTL converter 54, which also is connected to a chip select (SL) from address decode logic 31. The output of analog/TTL converter 54 is connected to interrupt request cause register 42. Interrupt request cause register 42 also receives an input from an over current sense circuit 55.

Interrupt request cause register 42 is activated by a chip select signal (SL) from address decode logic 31. The data pins of register 42 are connected to data bus 40.

An optical shaft encoder of the type familiar in the art provides an A and a B signal to analog/TTL converter 56. The A and B signals are sinusoidally varying waveforms and are in quadrature phase relationship. The outputs of analog/TTL converter 56 are connected to position logic 43. Position logic 43 converts the A and B signals from the optical shaft encoder to a digital indication of the position of the servomotor. This is accomplished by using the A and B signals to identify the direction and amount of rotation of the servomotor and appropriately incrementing or decrementing a counter. A first chip select (SL) signal is used to zero logic 43. A second chip select (SL) signal is used to instruct logic 43 to load. A third and fourth chip select signals (SL) are used to activate logic 43 for a reading. The data pins of logic 43 are connected to data bus 40.

An analog tachometer connected to the shaft of the servomotor provides a signal which is coupled, through low pass filter 57, to velocity analog-to-digital converter 44. A first chip select (SL) signal connected to converter 44 is used to command converter 44 to start. Second and third chip select signals are used to perform a read operation. Analog-to-digital converter 44 produces a digital measure of the velocity of the servomotor shaft which is passed to data bus 40.

When microprocessor 30 has calculated an updated drive voltage, a digital word corresponding to that voltage is passed to digital-to-analog converter 45 on data bus 40. In addition, a pair of chip select (SL) signals serve to activate converter 45. Converter 45 converts the digital drive voltage signal to an analog one and provides the updated drive voltage to the servomotor. In addition, an overcurrent sense circuit 55 receives an input from the servomotor and senses when converter 45 attempts to apply an excessive drive current. An overcurrent signal is then provided to interrupt request cause register 42. In addition, overcurrent sense circuit 55 causes converter 45 to cease producing the excessive drive current. A chip select (SL) input to overcurrent sense circuit 55 is used to clear circuit 55.

A status register 46 receives inputs from data bus 40, a chip select (SL) signal from address decode logic 31. The outputs of register 46 are passed through a TTL/CMOS converter 58. The outputs of register 46 comprise a wheel zero (WHEEL O*) signal and a low power (LOW POWER*) signal. Wheel zero signal indicates to the machine controller that the servomotor is in its home position. The low power signal indicates that a low power condition has been identified.

Microprocessor 30 reads the information from registers 41 and 42 and analog-to-digital converters 43 and 44, performs the motor characterization calculations to select a set of gains, performs the state-feedback regulator calculation and outputs the resulting drive voltage to digital-to-analog converter 45. Immediately, microprocessor 30 returns to reading the necessary input information to produce a new drive voltage. In a particular embodiment of the present invention microprocessor 30 completes the above cycle in approximately 200 microseconds. As much as 0.5 milliseconds or more may be used for each cycle and still provide accurate operation.

In order to achieve stable operation, it is necessary to minimize the time between updates of the drive voltage. This may require some compromise in the frequency of the characterization and gain selection steps. In a particular embodiment of the present invention, position measurements are stored in an accumulator used for characterization once every 10 sample periods, and then only if the motor is operating in a saturated condition. Every fourth step change commanded by the machine controller triggers the reading of that accumulator, the scaling of its value and the reading of the gain tables for an updated set of gains. Of course, these trade-offs and timing considerations will be unique to each implementation of the present invention.

Utilizing the methods described above and the controller board described with reference to FIG. 4, one may achieve very high speed servomotor positioning. However, it has been found that the effects of hysterysis in the servomotor may cause some discrepancy between the setpoint and the actual final position of the servomotor. This is due to the fact that the final drive voltage produced by the servomotor controller may be less than the voltage required to produce any servomotor movement. The fact the servomotor has some lower threshold on drive voltage is a hysterysis-related effect. It has been found that it is possible to slightly alter the method described above if it is desired to achieve a highly accurate position of the servomotor.

During most of the servomotor positioning cycle, the methods described above are extremely accurate and fast. Therefore, the software in ROM 35 (FIG. 4) is modified so that when the servomotor is extremely close to its final position, the state-feedback equation of equation (13) is altered to:

$$V = -[K_1 X_1 + K_2 X_2 + K_3 S_i] \qquad (27)$$

In a particular embodiment of the present invention, a tolerance window of four counts about the desired setpoint is available. Thus, the software in ROM 35 is set to trigger the shift to equation (27) when the actual position of the servomotor is within four counts of the setpoint. Of course, other windows and trigger points may be applicable in other situations.

In equation (28), the variables, $K_1$, $X_1$, $K_2$ and $X_2$ are the same as in equation (11). However, in this terminal mode of positioning, the gain variables, $K_1$ and $K_2$ are set to a particular value rather than being chosen from a gain table. The summation integral $S_i$ represents the integral of $X_1$ over the time period from the beginning of the current positioning cycle to the immediately preceding time interval. This integral is constantly being updated by microprocessor 30 and so is available when needed. $K_3$ is a gain whose optimum value must be found by experimentation with the particular system being used. It is found that decreasing the value of $K_1$, thus making the system less sensitive to position errors, decreases oscillation about the setpoint in this final phase of positioning.

The purpose of the summation integral $S_i$ and its associated gain $K_3$ is to identify those conditions in which a residual position error remains. As this residual error exists over an increasing span of time, the value of $S_i$ will increase correspondingly. Eventually, a drive voltage exceeding the hysterysis threshold will be generated and the servomotor will be accurately positioned. Once the residual position error has been eliminated, the software reverts to its other mode, represented by equation (13), to be ready for the next change in position.

By now it should be apparent that improved servomotor positioning is provided by an apparatus in which servomotor operation is being continuously characterized and optimum state-feedback gains are chosen according to that characterization. A method has been disclosed by which this characterization may be accurately performed in a real time servomotor controller. In addition, a simulation method has been described by which accurate gain tables may be produced for use by the on line adaptive servomotor controller.

I claim:

1. In a servomotor apparatus of the type comprising a servomotor, a servomotor controller and feedback means for providing feedback from said servomotor to said servomotor controller, the improvement comprising:

characterization means for periodically evaluating the equation:

$$\omega_m = \frac{2\theta(t)K_{mv}\Omega}{Et^2};$$

where

Wm is mechanical break frequency, $\theta$ (t) is motor shaft position with time, $K_{mv}\Omega$ is the back EMF constant of the servomotor, E is the voltage input to the servomotor, and t is time; and gain selection means for selecting one of a plurality of gain sets in response to said characterization of said servomotor, said selected gain set being supplied to said servomotor controller.

2. A servomotor apparatus comprising:

a servomotor;

means for selectively applying a drive voltage to said servomotor;

feedback means for providing indications of a shaft position and a shaft velocity of said servomotor;

characterization means for periodically evaluating the equation:

$$\omega_m = \frac{2\theta(t)K_{mv}\Omega}{Et^2};$$

where $W_m$ is mechanical break frequency, $\theta$ (t) is motor shaft position with time, $K_{mv}$ $\Omega$ is the back EMF constant of the servomotor, E is the voltage input to the servomotor, and t is time;

gain selection means for responding to said characterization means to select one of a plurality of gain sets; and controller means for receiving said indications of servomotor shaft position and shaft velocity, said selected gain set and a desired servomotor shaft position and for controlling said means for selectively applying a drive voltage in response thereto.

3. A method of controlling a servomotor comprising the steps of:

monitoring a difference between an actual state of said servomotor and a desired state thereof;

estimating a mechanical break frequency of said servomotor by evaluating the equation:

$$\omega_m = \frac{2\theta(t)K_{mv}\Omega}{Et^2};$$

where $W_m$ is the mechanical break frequency, $\theta$ (t) is motor shaft position with time, $K_{mv}\Omega$ is the back EMF constant of the servomotor, E is the voltage input to the servomotor, and t is time;

selecting a gain set from a plurality of gain sets responsive to said estimation of said mechanical break frequency;

applying said gain set to said difference between said desired and actual states of said servomotor;

determining a drive signal responsive to said application of said gain set to said difference; and applying said drive signal to said servomotor.

* * * * *